United States Patent [19]
Brisson

[11] Patent Number: 5,066,853
[45] Date of Patent: Nov. 19, 1991

[54] SYSTEM FOR RESERVING A SUPPLY OF GOODS OR SERVICES

[75] Inventor: Pierre Brisson, Meyrargues, France

[73] Assignee: SGS Thomson Microelectronics SA, Gentilly, France

[21] Appl. No.: 247,085

[22] Filed: Sep. 20, 1988

[30] Foreign Application Priority Data

Sep. 21, 1987 [FR] France ................................. 87 13017

[51] Int. Cl.⁵ .......................... G06F 15/21; G06F 7/10
[52] U.S. Cl. ....................................... 235/381; 235/384
[58] Field of Search ............... 235/380, 381, 382, 384, 235/375; 364/749

[56] References Cited

U.S. PATENT DOCUMENTS

| 3,457,391 | 7/1969 | Yamamoto | 235/381 |
| 3,691,527 | 9/1972 | Yamamoto | 235/381 |
| 4,199,100 | 4/1980 | Wostl et al. | 235/381 |
| 4,247,759 | 1/1981 | Yuris et al. | 235/381 |
| 4,298,793 | 3/1982 | Melis et al. | |
| 4,567,359 | 1/1986 | Lockwood | |
| 4,598,810 | 7/1986 | Shore et al. | 364/749 |
| 4,803,348 | 2/1989 | Lohrey et al. | 235/381 |
| 4,866,661 | 7/1989 | de Prins | 235/380 |

FOREIGN PATENT DOCUMENTS 2503423 8/1982 France .
2178211 2/1987 United Kingdom .

Primary Examiner—David Trafton
Assistant Examiner—Richard M. Weinberg
Attorney, Agent, or Firm—Roland Plottel

[57] ABSTRACT

To reserve a supply of a good or service, a chip type memory card is inserted into a terminal of a reserving device. This reserving device makes the reservation by sending indications about this reservation to a terminal located near the goods or services to be delivered. On the agreed date and at the agreed place, the renting party goes to this terminal and inserts his memory card therein. The terminal then tells him where and how he should get and use the service or good reserved by him. This system can be applied in particular when the good or service to be obtained by self-service concerns the renting of a vehicle.

4 Claims, 1 Drawing Sheet

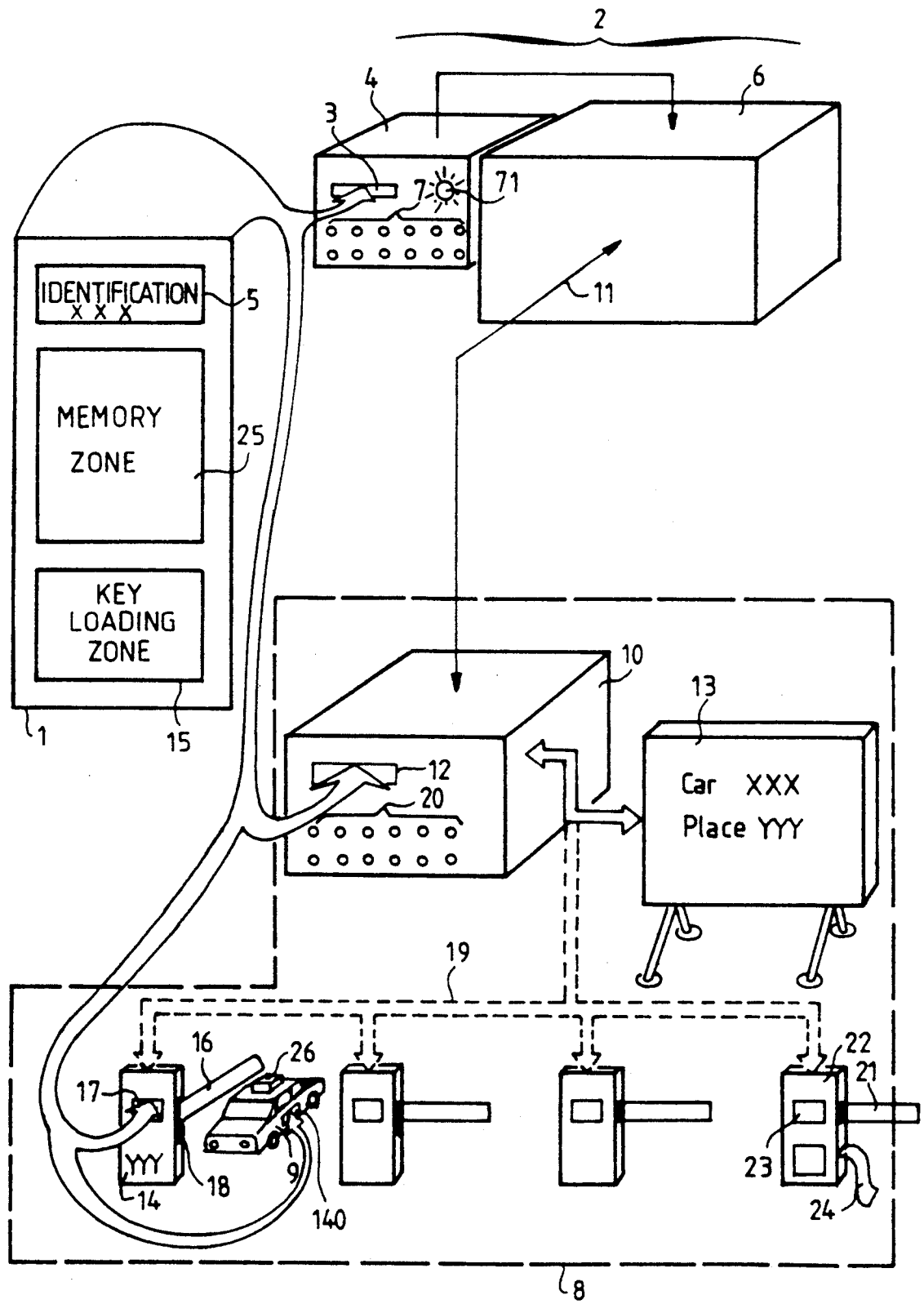

SYSTEM FOR RESERVING A SUPPLY OF GOODS OR SERVICES

BACKGROUND OF THE INVENTION

1. Field of the Invention

An object of the present invention is a system to reserve a supply of goods or services to be obtained by self-service. This system of reservation is preferably one giving access to the supply of goods or services of a commercial type such as car rental or train seat reservation services. This system is more especially designed for suppliers of services providing their customers with services whose availability is not always entirely within their control. The system of the invention includes the use and operation of memory cards distributed by this supplier of services to his customers. These memory cards may be magnetic recording cards. They are preferably memory cards furnished with electronic integrated circuits, called chip cards, to ensure the safety of the transactions for which they are used.

2. Description of the Prior Art

Although car rental services need not be considered to be the only field of application of the invention, it shall be used as an example to demonstrate the drawbacks of such systems and the solutions brought to them by the invention. Car rental systems and the long drawn out administrative formalities that this service necessitates are well known. For, it is essential to identify the future driver of the rented car, especially to take down his driving license number, firstly in order to establish a relationship of responsibility between the rental firm and the driver and, secondly, as an option, to offer him or her personalized services such as insurance or special reductions. To speed up these formalities and also to create loyal customers, certain rental firms have taken to giving those customers who wish it, cards which are pre-recorded either mechanically or magnetically and have all the indications needed to identify these customers. Upon reaching his destination, generally at an airport or a railway station, a customer goes to the counter of the rental firm with which he is affiliated. There he fills in a rental form with the rental firm's agent by handing him his card. Besides, in many cases, customers with cards have priority over those without them. At the end of these formalities the rental firm's agent gives the customer the keys of the car that he has just hired and has had allocated to him, and tells him what car it is and where it is in a parking lot.

There are many problems with reserving cars. Essentially, unlike the practice in railway transport for example, it is never certain that the service, namely the car, will be available. For, previous customers might have decided to extend the period for which they had undertaken to hire a car. Furthermore, it often happens that a customer takes charge of a vehicle in one place and returns it to the rental firm in another place. By increasing the the rental firm's fleet of vehicles, these problems of availability can be solved statistically. However, while it could then be supposed that the demand can be met on the whole, vehicles that have actually been returned on time and are available at a parking place cannot be handed over to customers without human action.

Thus, the advance reservation of a vehicle at a given place and on a given date does not truly correspond to a reservation. For, it does not prevent the customer from having to stand in a queue consisting of all those who have also made reservations and have come to the rental firm's counter to get information about the renting of the vehicles allocated to them. The indispensable presence of staff responsible for making the vehicles available increases the cost of renting vehicles. Furthermore, the fact that the vehicles in question are often taken at late hours and even at night entails exacting work. And the additional cost related to work done outside normal working times also increases the cost of renting a vehicle. The solution wherein the rental firm's staff work in the daytime to maintain returned vehicles, for example, cannot be envisaged with a system of this type.

An object of the invention is to overcome this drawback by proposing a system wherein, to make the reservation, identify the renting party and, especially, to provide access to the supply of the reserved good or service, a memory card is used having interactive links with the reservation system and with means of access to this good or service. Thus, once the reservation is made, the reservation system or card, or even both, contain information relating to the reservation. Later, when the supplied service or good is taken, for example when the renting party goes and takes charge of the rented car, he inserts his card into a terminal of the reservation device near the place where he will take the supplied good or service. This terminal tells him where and how to find the car allocated to him. The place in which the car is parked can be displayed on an indicating panel connected to the terminal. In a preferred way, the "how" function is achieved by creating recognition protocols, at the instant when the card is inserted, between this card and a post for access to the good or service. This protocols may consist in the addition of an electronic key to the card in such a way that, near the designated vehicle, the customer inserts his card into an access post called a vehicle releasing post or, more generally, a post to release the supply or a good or service, which physically gives him access to the good or service. Preferably, the chip card will play the role of a key that opens the doors of the vehicle, and that of a switch key to start this vehicle.

When the rental period is over, the renting party will place the car that he has used in a parking place belonging to the rental firm, and will block all access to this vehicle by inserting his card into the releasing post associated with this parking place. A barrier controlled by the releasing terminal is then lowered while the post may issue a receipt concerning the characteristics of the service provided, in particular its duration. This post can also be used to introduce these characteristics in a suitable zone of the memory card.

SUMMARY OF THE INVENTION

An object of the invention, therefore, is a system for reserving the supply of a good or service to be obtained by self-service, said system comprising memory cards assigned to customers for the good or service supplied and a reservation device designed to receive the cards during the reservation operation and to make the reservation, wherein the memory cards are chip cards and wherein the system comprises means for the physical delivery of the good or service supplied, functionally linked to the reservation device and provided with means to be put into operation by the card with which the reservation has been made.

BRIEF DESCRIPTION OF THE DRAWING

The invention will be better understood from the following description and the accompanying figure. This figure is given purely by way of indication and in no way restricts the scope of the invention.

DESCRIPTION OF A PREFERRED EMBODIMENT

The single FIG. 1 gives a schematic view of a system, according to the invention, for reserving a supply of a good or service to be obtained by self-service. This system has at least one memory card 1, allocated to a customer, and a reservation device 2 to receive, in a card reader 3 of a terminal 4 of this device, the card 1 during a reservation operation. The memory card 1 is a so-called chip card: it is provided with electronic integrated circuits for memorizing and interaction. During the reservation, the identification of the customer contained in a memory zone 5 of the card 1 is immediately transmitted to a central processing unit 6 of the reservation device 2. To make the reservation, the future renting party uses, for example, a keyboard 7 of the terminal 4, to program the characteristics of his rental requirements. For example, he indicates the date and time when he wishes to have the vehicle available, the place where he will take it, the type of vehicle desired as well as, as the case may be, the nature of his trip and the insurance terms he is willing to accept. In certain circumstances, several of these indications can be prerecorded in the card and automatically sent to the central processing unit 6. If the reservation can be accepted, for example by comparing the set of similar reservations already made with an index (which may or may not be statistical) of the availability of rented vehicles, a set of indicator lights 70 and 71 indicates this to the customer. The customer then validates the reservation through the keyboard 7.

The reservation system of the invention is chiefly characterized by the existence, at the place where the good or service is supplied, of means 8 giving access to the reserved good or service, for example, in this case, a vehicle 9. In the example shown, the means of access comprise a terminal 10 functionally connected by a transmission link 11 to the reservation device 2. The transmission link 11 may be of the radio or telephonic type. It can be done immediately after the reservation or else by direct link, capable of being called up by request. In the former case, the terminal 10 has memory means. In all cases, the terminal 10 has a memory card reader 12. When the renting party reaches the place where he wishes to rent the vehicle, he inserts his card 1 into the reader 12. The terminal 10 then recognizes the nature of the reservation and informs this renting party, by means of a neighboring indicator panel 12, that the vehicle 9 which has been allocated to him is in a given place in the car park. If need be, the indicator panel 13 can also give indications to show the renting party the way to this place.

However, the terminal 12 is actually more powerful. At this moment, it also creates a protocol common to the card 1 and to a releasing post 14 of the vehicle 9. This releasing post 14 makes it possible to physically retain the vehicle 9. It is at the position indicated by the panel 13. More simply, this access post may take the form of an electronic lock 140 to the doors of the vehicle 9 and/or a device (not shown) to start up the vehicle by means of the card 1. In one example, this protocol consists of a logic key. For example, it comprises the recording of a digital code in a memory zone 15 of the card before this card is given to the renting party. After taking the card given to him by the terminal 10, the renting goes near the vehicle 9 to which the access may be controlled by a barrier 16 controlled by the post 14 and/or by doors of this vehicle controlled by the lock 140. The post 14 and/or the lock 140 also have a memory card reader 17. The renter inserts his card into the reader 17. Logic means contained in the terminal 14 and/or the lock 140 then recognize the protocol created by the terminal 12 and cause the barrier 16 to tilt or, as the case may be, the doors to open. The tilting of the barrier 16 may also be coupled electrically or mechanically with the opening of a box 18 containing the keys of the car 9. After enabling the doors to be opened, the card 1 also enables the car to be started with the switch key. Thus, access to this service has been obtained entirely automatically.

The creation of the protocol at the last moment can be justified with respect to the phenomenon of the rental system itself. By creating a releasing protocol as soon as the reservation is made, using means which shall be examined further below and which comprise a direct link between the posts 14 and the central processing unit 6, the creation of this protocol in the terminal 10 could have been avoided. However, this would amount to overlooking cancelled reservations, changed decisions by previous renting parties or, even if everybody could not get service, it would amount to overlooking the order of priority of arriving customers with respect to vehicles and, especially, the actual presence of vehicles at the positions controlled by the posts. In these conditions, it would be wiser to allocate the vehicle at the last minute, namely when the renting party is about to take actual charge of the vehicle.

The invention reconciles the need to give the renting party the information necessary to the renting operation vehicle and the need to give him a key providing access to this rental at the last moment with the fact that this information and this access are not known at the time of reservation. If the terminal 10 has no programmed means to define the protocol, it enters into communication, at this moment, with the central processing unit 2 which defines the protocol.

The fact that the protocol takes the form of the loading of a logic key in the memory card 1 prevents the need to connect each post 14 to the terminal 12. Under these conditions, the posts and the terminal can be independent. It is enough for the terminal 10 to allocate, as the logic key, the known key of the terminal 10 corresponding to the post 14 to which the customer is asked to go. As an alternative, the chip-type memory cards may not be provided with a key-loading zone 15. In this case, no logic key is loaded in these zones, but characteristics pertaining to the identification of the renting party who will reach the post is sent by the link 19, shown with dashes, to the concerned post. When the renting party nears this post and inserts his card therein, the post recognizes his identity (rather than its own logic key). The barrier 16 opens under the same conditions.

In a preferred way, the terminal 10 also has a programming key 20 enabling any renting parties who have cards but have not made reservations to reserve and rent a car at the same time at the very place where they are renting it. Inasmuch as the fleet of vehicles managed by this terminal 10 may not have any more unreserved, available vehicles, this terminal 10, upon receiving this request, could cause information to be displayed on the panel 13, enabling the renting party to find another solution.

When the renting party has finished using the vehicle, he drives it back to a parking place belonging to the rental firm. He parks the vehicle in an available place which has its barrier 21 of the post 22 initially lifted. All he has to do then is to insert his card in the reader 23 of the post 22 to cause the barrier 21 to be closed and to obtain a receipt 24 issued by the post 23. The receipt will indicate, for example, the characteristics of the service supplied to him, notably its duration. The issuing of the receipt can be replaced or accompanied by the loading of characteristics of the service supplied in a memory zone 25 of the card 1. Of course, the customer puts back the keys of the car in the box of the barrier 21 before inserting his card. The post may also have a logic function preventing the barrier 21 from being closed for as long as the car keys have not been put back in its box. When the card 1 itself acts as the switch key, the access to the car is blocked more easily.

If the posts 14 or 22 are not connected to the terminal 10, the renting party may subsequently be asked to reinsert his card again in the terminal 10 so that this terminal can transmit the characteristics of rental service provided to a rental management department. These characteristics are contained in the memory zone 25 of the card 1. If necessary, the customer may be asked to program, through a keyboard 20, the number of kilometers travelled as well as any breakdowns suffered by him. As a preferred alternative, an on-board computer 26 of the vehicle which has received the card 1 may insert all these indications in the zone 25 to enable this automatic transmission. If, on the contrary, the posts 14 and 22 are connected by a bus 19, the characteristics of the rental operation may be transmitted automatically from the place where the car is returned. If necessary, the posts 22 may be provided with keyboards used to enable the programming of the kilometers travelled if the vehicles do not have any on-board computer. In both cases, whether the terminals are connected to the terminal 10 or not, it is thus seen to it that the terminal has all the data needed to manage its actually available fleet of vehicles.

What is claimed is:

1. A system for reserving the supply of a good or service to be obtained by self-service, said system comprising chip cards assigned to customers of said good or service, a central reservation device having a card reading apparatus designed to receive a customer card during a reservation operation, and interface means for communication with a customer, said central reservation system capable of writing in the card information relating to a reservation made by the owner of the card through said interface means, local terminals connected to said central reservation device and remote from said central reservation device, said local terminals adapted to receive a customer card, means associated with and controlled by each of said local terminals for physically delivering said good or service near said local terminal in response to information stored in the same card with which reservation of the good or service has been made, wherein means are provided at said local terminal to write in the card an access key for one specific good or service among the available goods or services at that local terminal, said means for physically delivering a good or service comprise a card reading apparatus located at a remote place from said local terminal where said specific good or service is available, and means for enabling delivery of said specific good or service in response to reading said access key from the card in said last mentioned card reading apparatus.

2. A system according to claim 1, wherein means are provided at said local terminal to display for the customer information relative to the specific good or service, while writing in the card an access key for that specific good or service.

3. A system according to claim 2, wherein said means to display information comprises means for displaying information relative to the place where said specific good or service is available.

4. A system for car rental reservation, according to one of claims 1 to 3, wherein said good or service is a vehicle, and said means for enabling delivery of said vehicle comprise a barrier at a parking place allocated to a specific vehicle and/or means for opening a door of said specific vehicle, and/or means for enabling ignition of said vehicle.

* * * * *